(12) United States Patent
Hensgen et al.

(10) Patent No.: US 10,512,899 B2
(45) Date of Patent: Dec. 24, 2019

(54) NOBLE METAL-FREE CATALYST COMPOSITIONS

(71) Applicant: TREIBACHER INDUSTRIE AG, Treibach-Althhofen (AT)

(72) Inventors: Lars Hensgen, Klagenfurt (AT); Karl Schermanz, Launsdorf (AT); Klaus Stöwe, Chemnitz (DE); Viktor Wolf, Saarbrücken (DE)

(73) Assignee: TREIBACHER INDUSTRIE AG, Treibach-Althofen (AT)

( * ) Notice: Subject to any disclaimer, the term of this patent is extended or adjusted under 35 U.S.C. 154(b) by 310 days.

(21) Appl. No.: 15/327,605

(22) PCT Filed: Jul. 24, 2015

(86) PCT No.: PCT/EP2015/067010
§ 371 (c)(1),
(2) Date: Jan. 19, 2017

(87) PCT Pub. No.: WO2016/016127
PCT Pub. Date: Feb. 4, 2016

(65) Prior Publication Data
US 2017/0203282 A1 Jul. 20, 2017

(30) Foreign Application Priority Data

Jul. 29, 2014 (EP) .................... 14178892

(51) Int. Cl.
*B01J 23/843* (2006.01)
*B01J 37/03* (2006.01)
(Continued)

(52) U.S. Cl.
CPC ...... *B01J 23/8437* (2013.01); *B01D 53/8687* (2013.01); *B01D 53/944* (2013.01);
(Continued)

(58) Field of Classification Search
CPC ............... B01J 2523/00; B01J 2523/12; B01J 2523/13; B01J 2523/24; B01J 2523/48;
(Continued)

(56) References Cited

U.S. PATENT DOCUMENTS 4,460,706 A * 7/1984 Imanari ............... B01J 23/83
502/304
8,071,501 B2 12/2011 Kaneshiro et al.
(Continued)

FOREIGN PATENT DOCUMENTS

DE 102009002182 9/2010
EP 1817096 8/2007
(Continued)

OTHER PUBLICATIONS

Quinelato et al. "Synthesis and sintering of $ZrO_2$—$CeO_2$ powder by use of polymeric precursor based on Pechini process", Journal of Material Science vol. 36, 2001, 3825-3830.
(Continued)

*Primary Examiner* — Melvin C. Mayes
*Assistant Examiner* — Smita S Patel
(74) *Attorney, Agent, or Firm* — Workman Nydegger

(57) ABSTRACT

A composition of formula $$Ce_{1-a-b-c}N_aM_bD_cO_x \quad \text{I}$$

wherein M stands for one or more elements from the group of alkaline metals, except sodium, N is Bi and/or Sb, D is present, or is not present, and if present is selected from one or more of Mg, Ca, Sr, Ba; Y, La, Pr, Nd, Sm, Gd, Er; Fe, Zr, Nb, Al; a is a number within the range of $0<a\leq 0.9$, b is a number within the range of $0<b\leq 0.3$, c is a number within the range of $0<c\leq 0.2$, a plus b plus c is $<1$, and x is a number within the range of $1.2\leq x\leq 2$, and its use for exhaust gas
(Continued)

aftertreatment systems of Diesel engines, gasoline combustion engines, lean burn engines and power plants.

20 Claims, 1 Drawing Sheet

(51) Int. Cl.
| | |
|---|---|
| *B01J 23/18* | (2006.01) |
| *B01D 53/94* | (2006.01) |
| *B01J 37/10* | (2006.01) |
| *B01J 35/00* | (2006.01) |
| *B01D 53/86* | (2006.01) |
| *B01J 37/08* | (2006.01) |
| *B01J 37/04* | (2006.01) |
| *F01N 3/035* | (2006.01) |

(52) U.S. Cl.
CPC .......... *B01J 23/18* (2013.01); *B01J 23/8435* (2013.01); *B01J 35/002* (2013.01); *B01J 37/036* (2013.01); *B01J 37/04* (2013.01); *B01J 37/08* (2013.01); *B01J 37/082* (2013.01); *B01J 37/10* (2013.01); *F01N 3/035* (2013.01); *B01D 2255/206* (2013.01); *B01D 2255/2022* (2013.01); *B01D 2255/2042* (2013.01); *B01D 2255/2045* (2013.01); *B01D 2255/2047* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/2096* (2013.01); *B01D 2255/2098* (2013.01); *B01D 2255/20715* (2013.01); *B01D 2255/20738* (2013.01); *B01D 2255/40* (2013.01); *B01D 2255/915* (2013.01); *B01D 2258/0283* (2013.01); *B01J 2523/00* (2013.01)

(58) Field of Classification Search
CPC ........ B01J 2523/3712; B01J 2523/3718; B01J 2523/54; B01J 2523/842; B01J 23/8437; B01J 23/18; B01J 23/8435; B01J 23/843; B01J 37/04; B01J 37/00; B01J 37/082; B01J 37/036; B01J 37/03; B01J 37/08; B01D 53/944; B01D 53/94; B01D 2255/2042; B01D 2255/2045; B01D 2255/2047; B01D 2255/206; B01D 2255/2061; B01D 2255/2063; B01D 2255/2065; B01D 2255/2066; B01D 2255/2068; B01D 2255/20715; B01D 2255/20738; B01D 2255/2092; B01D 2255/2096; B01D 2255/40; B01D 2255/915; B01D 2255/2098; B01D 2255/2022

See application file for complete search history.

(56) References Cited

U.S. PATENT DOCUMENTS

| | | |
|---|---|---|
| 8,114,354 B2 | 2/2012 | Li |
| 2001/0022956 A1* | 9/2001 | Okamoto ........... B01D 53/9422 |
| | | 423/213.5 |
| 2004/0102643 A1 | 5/2004 | Tway |
| 2009/0288401 A1 | 11/2009 | Kaneshiro et al. |
| 2011/0176969 A1* | 7/2011 | Michiaki .............. B01D 53/944 |
| | | 422/177 |

FOREIGN PATENT DOCUMENTS

| | | | |
|---|---|---|---|
| EP | 1829609 | 9/2007 | |
| EP | 2098289 | 9/2009 | |
| EP | 2098289 A1 * | 9/2009 | .......... B01D 53/944 |
| EP | 2210861 | 7/2010 | |
| EP | 2269730 | 1/2011 | |
| EP | 2210861 | 8/2012 | |
| JP | 201484750 A | 12/2014 | |
| RU | 2341327 | 4/2005 | |
| WO | WO2006044822 | 4/2006 | |

OTHER PUBLICATIONS

Sardar et al. Nanocrystalline Cerium-Bismuth Oxides: Synthesis, Structural Characterization, and Redox Properties, Chemistry of Materials, vol. 22, No. 22, Nov. 23, 2010 (Nov. 23, 2010), pp. 6191-6201, ISSN: 0897-4756, doi: 10.1021/cm1025848.
Spiess (Umicore AG) at the CAPoC9 (Aug. 2012).
Walker et al. Controlling particulate emissions from Diesel vehicles, Topics in Catalysis vol. 28, 2004, 165-170.
Blank, et al., "A 'Green Route' to Propene Through selective Hydrogen Oxidation" Chem. Eur. J., Apr. 2007, Nr. 13, S. 5121-5128.
Beckers, et al., "Selective Hydrogen Oxidation Catalysts via Genetic Algorithms" Adv. Synth. Catal., Sep. 2008, Nr. 350, S. 2237-2249.

* cited by examiner

NOBLE METAL-FREE CATALYST COMPOSITIONS

The present invention relates to a noble metal-free catalyst composition, which is e.g. useful for the oxidation of particulate matters (PM).

BACKGROUND OF THE INVENTION

Exhaust gases of Diesel engines contain PM, which may cause environmental problems. To trap the PM, a Diesel particulate filter (DPF) was designed, in which the PM is filtered from the exhaust gas. The most common type of DPF is a ceramic wall flow filter made of SiC or cordierite. Because the collected PM is accumulated in this filter, the backpressure is increasing and the power of the engine is decreasing. Therefore the wall flow filter is to be regenerated continuously (passive) and/or discontinuously (active) to burn off the soot (see e.g. A. P. Walker et al, Controlling particulate emissions from Diesel vehicles, Topics in Catalysis Vol. 28, 2004, 165-170).

For example, in U.S. Pat. No. 8,114,354 it is described that for the passive regeneration the filter has to be washcoated with a catalytic composition. This catalytic composition, comprising elements of the group of Al, Ce, Zr, Si, zeolites, base metals and noble metals, oxidizes the NO to $NO_2$, which is a better oxidant for soot than oxygen. The active uncatalyzed regeneration operates around 650° C. Postinjection of fuel directly in front of the Diesel Oxidation Catalyst (DOC) is the most common method to reach this temperature. The postinjection method has the disadvantages of an increased consumption of fuel and of the dilution of the motor oil.

According to the presentation given by S. Spiess (Umicore AG) at the CAPoC9 (August 2012) gasoline direct injection vehicles are gaining market share to reach new $CO_2$ emission limits. Through this new technique the fuel consumption and $CO_2$ emission can be reduced, but the vehicles release about significantly more particles than traditional gasoline engines and 10 times more than new Diesel engines. This pollution can be prevented with a gasoline particulate filter (GPF) which can significantly reduce the emissions of particles.

Efforts have already been made to provide a catalyst for the catalytic oxidation of PM with oxygen at lower temperatures to decrease the amount of active regeneration cycles and regeneration time. Thus, the fuel consumption could be decreased and the operation performance of the motor oil can be increased.

In DE 102 00 900 2182 various noble metal free mixed oxides are disclosed for soot oxidation. Oxides on base of iron, chromium and cobalt are disclosed.

EP 2 210 861 relates to a Diesel particulate filter comprising a cerium-containing composite oxide with Bi and Pr, wherein the molar ratio of Ce, Bi, Pr is expressed by Ce:Bi:Pr=(1-x-y):x:y. wherein 0<x≤0.3 and 0<y≤0.5.

In U.S. Pat. No. 8,071,501 an exhaust gas purification catalyst comprising a composite oxide and a Platinum Group Metal (PGM, wherein PGM includes Ru, Rh, Pd, Os, Ir and Pt) is described, wherein the composite oxide consists of Ce, Bi and a lanthanide except La and Ce. In EP 2 269 730 these kind of composite oxides were extended by a further element selected from the group 3, 4 and 13 of the periodic table of elements.

In US 2009/0288401 there is disclosed a composite oxide for exhaust gas purifying catalyst containing Ce, Bi and one or more elements selected from the earth alkaline metals except beryllium. Additionally one or more further elements can be selected from Zr, Pr and Tb.

Perovskite type composite oxides for soot oxidation are claimed in EP 1 829 609. These perovskite compositions may be represented by the structural formula $RTO_3$, where R comprises one or more elements selected from a group made up La, Sr, Ba, Ca and Li; and T comprises one or more elements selected from a group made up of Mn, Fe, Co, Cu, Zn, Ga, Zr, Mo, Mg, Al and Si.

In WO 2006/044822 (EP 1 817 096) there is described a catalyst for the oxidation of soot consisting of an alkaline metal, cerium, oxygen and optionally a platinum group metal and/or zirconium. The most active materials are described to be combinations of cerium and potassium or cerium and caesium.

In Kripasindhu Sardar et al, Nanocrystalline Cerium-Bismuth Oxides: Synthesis, Structural Characterization, and Redox Properties", Chemistry of Materials, vol. 22, no. 22, 23 November 2010 (Nov. 23, 2010), pages 6191-6201, ISSN: 0897-4756, doi: 10.1021/cm1025848 there is described a Cerium-Bismuth mixed oxide with a background level of sodium. of sodium.

In EP 2 098289 a composite oxide for use in an exhaust gas purifying catalyst, containing Ce, Bi and one or more elements selected from Mg, Ca, Sr and Ba is disclosed. That catalyst is disclosed to be suitable to burn off PM of diesel exhaust gas at low temperatures and to be hardly poisoned due to sulfur oxide action.

OBJECTIVE AND SUMMARY OF THE PRESENT INVENTION

The compositions for the catalytic oxidation of PM disclosed in the state of the art do not fulfill all the requirements of catalytic performance, resistance against sulfur compounds and/or stability against hydrothermal treatment. Therefore the aim of the present invention is to provide a novel composition for the catalytic oxidation of PM, which has higher catalytic activity compared to the state of the art materials, showing higher hydrothermal stability and which is environmentally friendly.

In one aspect the present invention provides a composition of formula $$Ce_{1-a-b-c}N_aM_bD_cO_x \qquad \text{I}$$

wherein

M stands for one or more elements from the group of alkaline metals, except sodium, preferably potassium, N is Bi and/or Sb, preferably Bi, D is present, or is not present, and if present is selected from one or more of Mg, Ca, Sr, Ba; preferably Ca, Sr, Ba; more preferably Sr, Y, La, Pr, Nd, Sm, Gd, Er; preferably Y, Pr, La, Nd; more preferably Pr, Fe, Zr, Nb, Al; in one aspect preferably Fe, in another aspect preferably Al, a is a number within the range of 0<a≤0.9, such as 0.01<a≤0.9, b is a number within the range of 0<b≤0.3, such as 0.01<b≤0.3, e.g. 0.1<b≤0.2, c is a number within the range of 0<c≤0.2; preferably 0<c≤0.1, a plus b plus c is <1, and x is a number within the range of 1.2<x≤2.

In a further aspect in a composition of formula I D is present.

In another aspect in a composition of formula I D is not present and in that aspect the present invention provides a composition which is of formula $$Ce_{1-a-b}N_aM_bO_x \qquad \text{II}$$

wherein
M stands for one or more elements from the group of alkaline metals, except sodium
N is Bi and/or Sb,
a is a number within the range of $0<a\leq0.9$,
b is a number within the range of $0<b\leq0.3$,
a plus b is <1, and
x is a number within the range of $1.2\leq x\leq 2$.

In a further aspect the present invention provides a composition which is selected from the group consisting of
$Bi_{0.45}Ce_{0.45}K_{0.10}O_{1.65-1.4}$,
$Bi_{0.40}Ce_{0.40}K_{0.20}O_{1.4-1.2}$,
$Bi_{0.30}Ce_{0.60}K_{0.10}O_{1.7-1.4}$,
$Bi_{0.80}Ce_{0.10}K_{0.10}O_{1.5-1.4}$,
$Bi_{0.10}Ce_{0.80}K_{0.10}O_{1.8-1.4}$,
$Bi_{0.4}Ce_{0.4}K_{0.1}Sr_{0.1}O_{1.55-1.35}$,
$Bi_{0.4}Ce_{0.4}K_{0.1}Pr_{0.1}O_{1.6-1.4}$, and
$Bi_{0.4}Ce_{0.4}K_{0.1}Fe_{0.1}O_{1.6-1.4}$.

A composition, provided by the present invention, e.g. of formula I, is also designated herein as "composition of (according to) the present invention".

For the purpose of the present specification and claims the term "alkaline metal" means an alkaline metal, or a mixture of alkaline metals, e.g. more than one alkaline metal elements, except sodium. According to IUPAC an alkaline metal is an element from the group 1 of the periodic table of elements.

In a further aspect, the present invention provides a process for the preparation of a composition according to the present invention which is characterized in that a polymeric complex method is used, wherein complexed metal ions are linked via polymerization, preferably via polyesterification.

A process provided by the present invention is also designated herein as "process of (according to) the present invention".

The polymeric complex method used for the preparation of the compounds of the present invention is a method in analogy to the Pechini method, e.g. an analogous method as described in A. L. Quinelato et al, "Synthesis and sintering of $ZrO_2$—$CeO_2$ powder by use of polymeric precursor based on Pechini process", Journal of Material Science Vol. 36, 2001, 3825-3830.

More particularly a process of the present invention comprises the steps
a) preparing a solution of a bismuth salt in a mixture of water, an inorganic acid, one or more polymer precursors and optionally one or more complexing agents, in particular by dissolving bismuth oxide in nitric acid and diluting the solution with a mixture of water, one or more polymer precursors and optionally one or more complexing agent,
b) preparing a solution of cerium salt, alkaline salts and optionally one or more salts of D as defined in a compound of formula I, in water, one or more polymer precursors and optionally one or more complexing agents, in particular by dissolving a cerium salt, alkaline salt(s) and optionally one or more salts of D as defined in a compound of formula I in a mixture of water, one or more polymer precursors and optionally one or more complexing agents,
c) optionally adding an inorganic acid to the solution obtained in step b),
d) mixing metal solutions obtained under a) and b), or under a) and c) under stirring or vortexing, and
e) heat treating the solution obtained in d) under air in a temperature range of 300 to 1000° C., for 1 to 120 hours, preferably 350° C. to 600° C., most preferably 375-500° C., such as 400° C.,
preferably 1 to 50 hours, more preferably 4 to 10 hours, such as 5 hours,
with preferably one holding temperature
in a temperature range of 70-120° C., and more preferably a second holding temperature
in a temperature range of 120-250° C.

In a process of the present invention the complexing agent may also serve as an organic solvent.

In a process of the present invention the polymer precursor may also serve as an organic solvent.

In a process of the present invention an appropriate polymer precursor may be used in steps a) and b), preferably the same polymer precursor may be used in steps a) and b). Appropriate polymer precursors comprise polycarboxylic acids, hydroxyl-carboxylic acids, polyhydric alcohols and mixtures thereof, preferably polyhydric alcohols and polycarboxylic acids and mixtures thereof, more preferably polyhydric alcohols. Most preferably ethylene glycol is used as a polymer precursor.

In a process of the present invention an appropriate complexing agent may be used in step a) and b), preferably the same complexing agent may be used in steps a) and b). Appropriate complexing agents include organic compounds, e.g. organic acids, ketones, aldehydes, alcohols, amines and mixtures thereof, preferably polycarboxylic acids, more preferably citric acid and oxalic acid and most preferably citric acid. The complexing agent may increase the solubility of the metal salts, also the cross links in the polymeric structure and further the homogeneity of the metal distribution in the polymeric gel.

In a process of the present invention an appropriate alkaline salt includes salts of alkali metals, except sodium, e.g. nitrates, oxides, hydroxides, carbonates, sulfates, acetates, halogenides, preferably nitrates and carbonates, most preferably nitrates.

In a process of the present invention an inorganic acid in step a) and c) includes appropriate inorganic acids, e.g. nitric acid, sulfuric acid, hydrochloric acid and mixtures thereof, more preferably nitric acid, sulfuric acid and mixtures thereof, most preferably nitric acid.

In the case of using just polyhydric alcohols as polymer precursor without complexing agent or another polymer precursor an oxidizing inorganic acid, such as nitric acid, is preferably used as inorganic acid to oxidize a part of the polyhydric alcohols to polycarboxylic acids, which are suitable for the polyesterification with the non-oxidized polyhydric acids. By using a mixture of polyhydric alcohols and polycarboxylic acids the inorganic acid does not need to be an oxidizing acid to start the polymerization.

It was surprisingly found that the compositions of the present invention show a higher catalytic activity for the oxidation of PM compared to prior art materials.

Compositions of the present invention in the fresh status (calcined at 400° C.) exhibit an excellent catalytic activity (shown as lower $T_{50}$-values), which exceeds by far the activity of materials of prior art (which is evident from Table 2). By the introduction of an alkaline metal, except sodium, preferably potassium, to the system $CeBiO_x$ the catalytic activity for the oxidation of PM can be increased compared with cerium bismuth containing materials disclosed in prior art. The $T_{50}$-values (the temperatures, where 50% mass loss was observed between 200° C. and the end temperature) of the cerium bismuth alkaline mixed oxides of the present invention are up to 110° C. lower in contrast to the cerium bismuth containing compounds of the comparative examples which is evident from example 4, comparative example 2 in Table 2.

Furthermore it was surprisingly found that the compositions according to the present invention show a high thermal stability up to 800° C. The thermally aged compositions of the present invention show a higher catalytic activity for soot oxidation in comparison with the prior art materials which again is evident from Table 2. The $T_{50}$-values of the compositions (cerium bismuth alkaline mixed oxides) of the present invention are up to 115° C. lower compared to the cerium bismuth containing comparative compositions of the comparative examples which is e.g. evident from example 2 and comparative example 3 in Table 2.

Surprisingly potassium based materials show higher activity in the fresh status as well as in the aged status than sodium based cerium bismuth alkaline mixed oxides. The $T_{50}$-values of the compositions (cerium bismuth alkaline mixed oxides) of the present invention are in the fresh status up to 71° C. lower compared to the cerium bismuth sodium comparative example which is e.g. evident from example 4 and comparative example 1 in Table 2. Also after aging the $T_{50}$-values of the compositions (cerium bismuth alkaline mixed oxides) of the present invention are up to 65° C. lower compared to the cerium bismuth sodium comparative example which is e.g. evident from example 2 and comparative example 1 in Table 2. If D is present in a composition of the present invention, its activity in the fresh status may further be enhanced.

Because of that higher catalytic activity of compositions of the present invention, the temperature can be decreased to a range, which already can be reached in a normal driving cycle. Therefore the amount of postinjection of fuel for an active regeneration can be reduced.

Because exhaust gases of combustion engines contain a certain amount of water, a further important aspect of the present invention is the hydrothermal stability. Alkaline based materials disclosed in the prior art, e.g. in EP 1 817 096, are unstable against water. It was surprisingly found according to the present invention that by introduction of bismuth to the system of cerium alkaline mixed oxides, the system shows enhanced stability against hydrothermal treatment.

It was moreover surprisingly found that compositions of the present invention need lower temperatures for soot oxidation after hydrothermal aging compared with prior art materials. The $T_{50}$-values of a composition of the present invention (cerium bismuth alkaline mixed oxides) after hydrothermal treatment are up to 96° C. lower compared to the cerium potassium system (see example 1, comparative example 5 in Table 3). This aspect is believed to be attributed to free potassium species in prior art material (see FIG. 1). In contrast, no free potassium species were observed in the compositions of the present invention (see FIG. 2).

The compositions of the present invention are the first alkaline based catalysts for the oxidation of PM, which show a hydrothermal stability.

The compositions of the present invention are the first catalytic compositions, which combine the high catalytic activity for soot oxidation of an alkaline based material and the hydrothermal stability of an alkaline free material.

The compositions of the present invention are useful alone or in combination with a support material in coated or extruded form for DPF systems. In such embodiment, the compositions of the present invention are also useful alone or with a support for particulate filters for gasoline engines.

Compositions according to the present invention may be useful for exhaust gas aftertreatment of Diesel and lean burn engines, conveniently in combination with an SCR-catalyst in the application SCR on DPF.

A composition of the present invention may be used in application for the removal of soot, particularly in exhaust gas aftertreatment systems of Diesel and gasoline combustion engines and in addition the compositions of the present invention may also be used in other applications, e.g. removal of PM in power plants, e.g. in fossil fuel power plants or biomass power plants.

In a further aspect the present invention provides the use of a composition of the present invention for exhaust gas aftertreatment systems e.g. Diesel engines, gasoline combustion engines, lean burn engines and power plants.

Characterization

The compositions of the present invention were characterized partly in terms of XRD.

Powder XRD (X-ray diffraction) patterns were obtained using a PANalytical X'Pert PRO system with Ni-filtered Cu radiation (Cu—K$\alpha$1 and Cu—K$\alpha$2 dublett with wavelength of 1.5406 and 1.5444 Å). The instrument was operated in Bragg-Brentano-geometry with a PIXcel.

For catalytic testing on PM removal efficiency the compositions were subjected to the catalytic powder testing conditions as described below.

Conditions for Catalytic Powder Testing

Sample Preparation

The synthesized solid samples of the present invention were pestled manually in an agate mortar. Powdered samples and carbon black (CB, Printex 90, Evonik Degussa GmbH (Method A), or CB, Printex U, Evonik Carbon Black GmbH (Method B)) were carefully mixed with a spatula in a mass ratio of 4:1 until the mixture was homogeneous to result in a loose contact mode.

Measurement of the Catalytic Activity

The determination of characteristic soot combustion temperatures ($T_{50}$-values, i.e. temperatures, where 50% mass loss was observed between 200° C. and the end temperature) was performed by thermogravimetrical data recording through two different methods.

Method A was made with a TGA/DSC 1 simultaneous thermal analyzer (Mettler Toledo Corp.). A mixture of 8% $O_2$, 350 ppm CO, 250 ppm NO, 50 ppm propane, 50 ppm $SO_2$ and $N_2$ as a balance was used as model feed gas. The total gas flow was 50 ml/min. The soot combustion activities of the catalysts were measured under dynamic conditions with a heating ramp of 10° C./min in a temperature range of 25° C. to 700° C.

Method B was made with a NETSCH STA 409 C/CD. A mixture of 20% $O_2$ in $N_2$ was used as model feed gas. The total gas flow was 50 ml/min. The soot combustion activities of the catalysts were measured under dynamic conditions with a heating ramp of 5° C./min in a temperature range of 25° C. to 700° C.

For testing on thermal stability the compositions were subjected to the following conditions for thermal aging:

Conditions for Thermal Aging

The thermal pretreatment was performed by calcination of powdered samples at 800° C. for 2 hours in a conventional muffle oven.

For testing on hydrothermal stability the catalytic compositions were subjected to hydrothermal pretreatment as described below.

Conditions for Hydrothermal Pretreatment

The hydrothermal pretreatment was performed in a custom-made 7-fold multiclave with Teflon inlets. The samples (100-120 mg) were suspended as prepared in 10 ml deionized water (filling level: 33%). The autoclave was heated up to 150° C. The multiclave was rotated along its cylindrical axis for 60 minutes in an oven at 150° C. and allowed to cool down again to room temperature. The hydrothermally aged samples were separated from liquid via filtration, washed with deionized water and dried in a vacuum drying oven at 60° C. and reduced pressure (<10 mbar).

BRIEF DESCRIPTION OF THE DRAWINGS (FIGS. 1 to 2)

MORE DETAILED DESCRIPTION OF THE INVENTION

Figure 1:
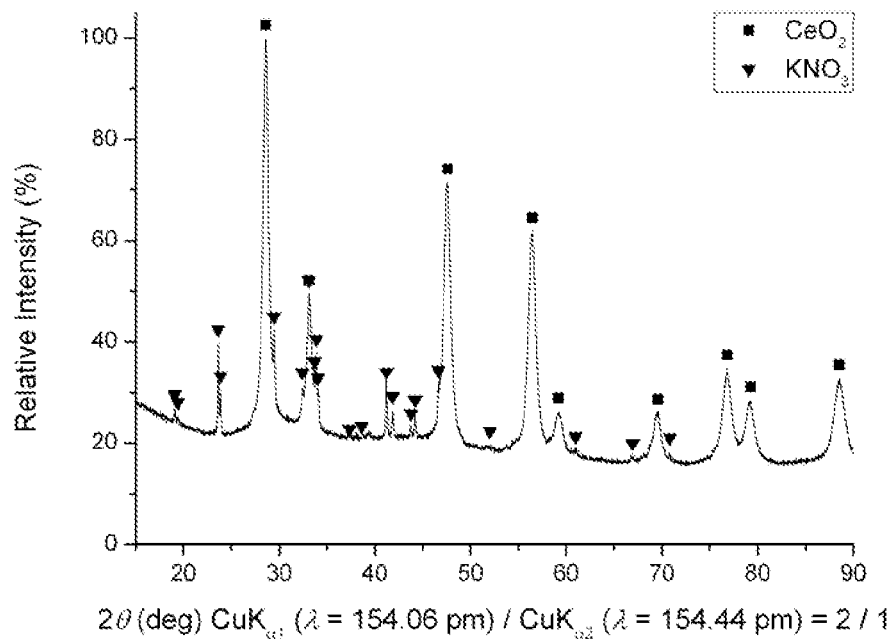
FIG. 1 shows powder x-ray diffraction patter of comparative example 4, reflexes refer to $CeO_2$ and $KNO_3$.
Figure 2:
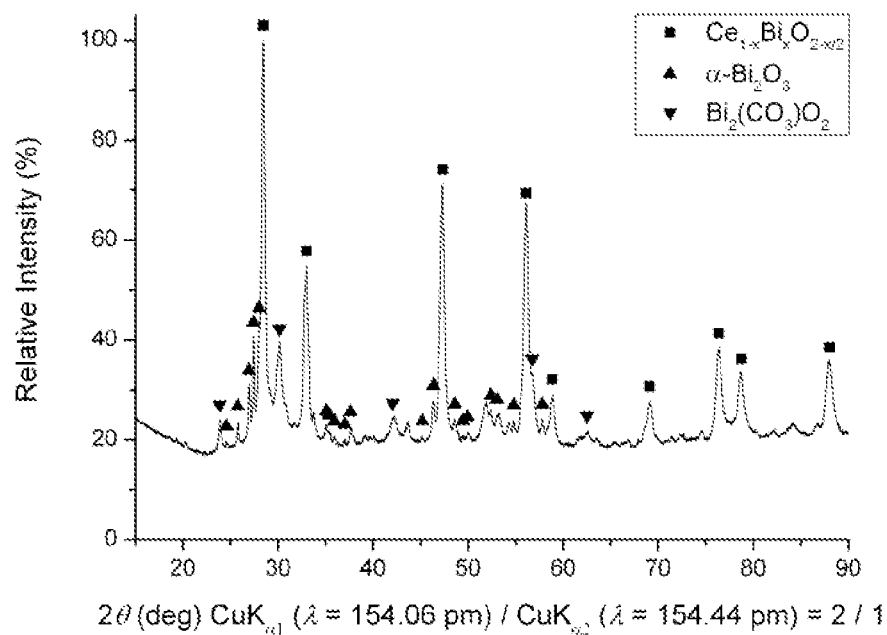
FIG. 2 shows powder x-ray diffraction patter of example 1, reflexes refer to $Ce_{1-x}Bi_xO_{2-x/2}$, $\alpha$-$Bi_2O_3$ and $Bi_2(CO_3)O_2$, no crystalline potassium species is detected

The present invention will now be explained in more detail with reference to examples and comparative examples without being limited to these. Temperatures indicated are in degree Celsius (° C.).

Synthesis

EXAMPLE 1

$Bi_{0.45}Ce_{0.45}K_{0.10}O_{1.65-1.4}$

Was synthesized via a polymer complex sol-gel method.

A mixture of 50 deionized water, 33.46 ml of ethylene glycol (EG) and 47.285 g citric acid monohydrate (CA) was used as solvent.

The stoichiometric amount of bismuth-(III)-oxide (0.1048 g of $Bi_2O_3$) was dissolved in 0.1477 ml concentrated nitric acid (69%) and 0.704 ml of the $H_2O$/EG/CA mixture were added (after the dissolution of $Bi_2O_3$ a white precipitate may form, which dissolves after adding the $H_2O$/EG/CA mixture). Cerium-(III)-nitrate hexahydrate (0.1954 g $Ce(NO_3)_3*6H_2O$) was dissolved in 0.842 ml of the $H_2O$/EG/CA mixture and 9 µl concentrated nitric acid (69%) were added. Potassium nitrate (0.0101 g $KNO_3$) was dissolved in 0.187 ml of the $H_2O$/EG/CA mixture and 2 µl of concentrated nitric acid (69%) were added. The three solutions obtained were mixed and vortexed for 60 minutes via an orbital shaker.

Subsequently solvent of the solutions was evaporated and the evaporation residue obtained was calcined in air. To evaporate the solvent the solutions were heated from room temperature up to 90° C. with a heating rate of 10° C./hour. After a dwell time of 5 hours at 90° C. the mixture was heated up to 200° C. with a heating rate of 5° C./hours. After holding this temperature for 5 hours the sample was heated up to 400° C. with a heating rate of 10° C./hour. The samples were calcined at 400° C. for 5 hours. The calcined oxide powders were cooled to room temperature with a rate of 20° C./hour (fresh samples).

EXAMPLE 2 to 5

The compositions referred to examples 2 to 5 are as disclosed in Tables 1A and 1B below and were prepared analogously to the procedure as disclosed in example 1 but using appropriate starting material and amounts. The quantities of the starting materials used for the preparation according to Examples 2 to 5 are listed in Tables 1A and 1B. A mixture of 50 ml deionized water, 33.46 ml ethylene glycol (EG) and 47.285 g citric acid monohydrate (CA) was used as a solvent

TABLE 1A

| Ex. | Composition | $Bi_2O_3$ [g] | $HNO_3$* [ml] | $H_2O$/ EG/CA [ml]* | $Ce(NO_3)_3*6$ $H_2O$ [g] |
|---|---|---|---|---|---|
| 2 | $Bi_{0.40}Ce_{0.40}K_{0.20}O_{1.4-1.2}$ | 0.0923 | 0.1313 | 0.625 | 0.1737 |
| 3 | $Bi_{0.30}Ce_{0.60}K_{0.10}O_{1.7-1.4}$ | 0.0699 | 0.0985 | 0.469 | 0.2605 |
| 4 | $Bi_{0.80}Ce_{0.10}K_{0.10}O_{1.5-1.4}$ | 0.1864 | 0.2626 | 1.251 | 0.0434 |
| 5 | $Bi_{0.10}Ce_{0.80}K_{0.10}O_{1.8-1.4}$ | 0.0233 | 0.0328 | 0.156 | 0.3474 |

TABLE 1B

| Ex. | Composition | $KNO_3$ [mg] | $HNO_3$** [µl] | $H_2O$/EG/CA** [ml] |
|---|---|---|---|---|
| 2 | $Bi_{0.40}Ce_{0.40}K_{0.20}O_{1.4-1.2}$ | 20.2 | 12 | 1.123 |
| 3 | $Bi_{0.30}Ce_{0.60}K_{0.10}O_{1.7-1.4}$ | 10.1 | 14 | 1.310 |
| 4 | $Bi_{0.80}Ce_{0.10}K_{0.10}O_{1.5-1.4}$ | 10.1 | 4 | 0.374 |
| 5 | $Bi_{0.10}Ce_{0.80}K_{0.10}O_{1.8-1.4}$ | 10.1 | 18 | 1.684 |

*for dissolving $Bi_2O_3$
**for dissolving other metal salts

EXAMPLE 6

$Bi_{0.4}Ce_{0.4}K_{0.1}Sr_{0.1}O_{1.55-1.35}$

Was synthesized via a polymer complex sol-gel method.

A mixture of 200 ml deionized water, 133.84 ml of ethylene glycol (EG) and 189.14 g citric acid monohydrate (CA) was used as solvent.

The stoichiometric amount of bismuth-(III)-oxide (5.26 g of $Bi_2O_3$) was dissolved in 11.81 g concentrated nitric acid (69%) and 40.77 g of the $H_2O$/EG/CA mixture were added (after the dissolution of $Bi_2O_3$ a white precipitate may form, which dissolves after adding the $H_2O$/EG/CA mixture). Cerium-(III)-nitrate hexahydrate (9.81 g $Ce(NO_3)_3*6H_2O$), potassium nitrate (0.57 g $KNO_3$) and strontium carbonate (0.83 g $SrCO_3$) were dissolved in 59.52 g of the $H_2O$/EG/CA mixture and 0.85 g concentrated nitric acid (69%) were added. The two solutions obtained were mixed for 60 minutes via a magnetic stirrer. Subsequently solvent of the solutions was evaporated and the evaporation residue obtained was calcined in air. To evaporate the solvent the solutions were heated from room temperature up to 70° C. with a heating rate of 7.5° C./hour. After a dwell time of 24 hours at 70° C. the mixture was heated up to 200° C. with a heating rate of 26° C./hours. After holding this temperature for 24 hours the sample was heated up to 400° C. with a heating rate of 200° C./hour. The samples were calcined at 400° C. for 5 hours. The calcined oxide powders were cooled to room temperature with a rate of 20° C./hour (fresh samples).

EXAMPLE 7

$Bi_{0.4}Ce_{0.4}K_{0.1}Pr_{0.1}O_{1.6-1.4}$

Was synthesized via a polymer complex sol-gel method.

A mixture of 200 ml deionized water, 133.84 ml of ethylene glycol (EG) and 189.14 g citric acid monohydrate (CA) was used as solvent.

The stoichiometric amount of bismuth-(III)-oxide (5.09 g of $Bi_2O_3$) was dissolved in 11.81 g concentrated nitric acid (69%) and 39.12 g of the $H_2O$/EG/CA mixture were added (after the dissolution of $Bi_2O_3$ a white precipitate may form, which dissolves after adding the $H_2O$/EG/CA mixture). Cerium-(III)-nitrate hexahydrate (9.48 g $Ce(NO_3)_3*6H_2O$), potassium nitrate (0.55 g $KNO_3$) and praseodymium nitrate hexahydrate (2.37 g $Pr(NO_3)_3*6H_2O$) were dissolved in 59.52 g of the $H_2O$/EG/CA mixture and 0.85 g concentrated nitric acid (69%) were added. The two solutions obtained were mixed for 60 minutes via an magnetic stirrer. Subsequently solvent of the solutions was evaporated and the evaporation residue obtained was calcined in air. To evaporate the solvent the solutions were heated from room temperature up to 70° C. with a heating rate of 7.5° C./hour. After a dwell time of 24 hours at 70° C. the mixture was heated up to 200° C. with a heating rate of 26° C./hours. After holding this temperature for 24 hours the sample was heated up to 400° C. with a heating rate of 200° C./hour. The samples were calcined at 400° C. for 5 hours. The calcined oxide powders were cooled to room temperature with a rate of 20° C./hour (fresh samples).

EXAMPLE 8

$Bi_{0.4}Ce_{0.4}K_{0.1}Fe_{0.1}O_{1.6-1.4}$

Was synthesized via a polymer complex sol-gel method.

A mixture of 200 ml deionized water, 133.84 ml of ethylene glycol (EG) and 189.14 g citric acid monohydrate (CA) was used as solvent.

The stoichiometric amount of bismuth-(III)-oxide (5.33 g of $Bi_2O_3$) was dissolved in 11.81 g concentrated nitric acid (69%) and 41.03 g of the $H_2O$/EG/CA mixture were added (after the dissolution of $Bi_2O_3$ a white precipitate may form, which dissolves after adding the $H_2O$/EG/CA mixture). Cerium-(III)-nitrate hexahydrate (9.94 g $Ce(NO_3)_3*6H_2O$), potassium nitrate (0.58 g $KNO_3$) and iron (III) nitrate nonahydrate (2.31 g $Fe(NO_3)_3*9H_2O$) were dissolved in 59.52 g of the $H_2O$/EG/CA mixture and 0.85 g concentrated nitric acid (69%) were added. The two solutions obtained were mixed for 60 minutes via an magnetic stirrer. Subsequently solvent of the solutions was evaporated and the evaporation residue obtained was calcined in air. To evaporate the solvent the solutions were heated from room temperature up to 70° C. with a heating rate of 7.5° C./hour. After a dwell time of 24 hours at 70° C. the mixture was heated up to 200° C. with a heating rate of 26° C./hours. After holding this temperature for 24 hours the sample was heated up to 400° C. with a heating rate of 200° C./hour. The samples were calcined at 400° C. for 5 hours. The calcined oxide powders were cooled to room temperature with a rate of 20° C./hour (fresh samples).

COMPARATIVE EXAMPLE 1

$Bi_{0.45}Ce_{0.45}Na_{0.10}O_{1.65-1.4}$

Was synthesized via a polymer complex sol-gel method.

A mixture of 50 ml deionized water, 33.46 ml of ethylene glycol (EG) and 47.285 g citric acid monohydrate (CA) was used as solvent.

The stoichiometric amount of bismuth-(III)-oxide (0.1048 g of $Bi_2O_3$) was dissolved in 0.1477 ml concentrated nitric acid (69%) and 0.704 ml of the $H_2O$/EG/CA mixture were added (after the dissolution of $Bi_2O_3$ a white precipitate may form, which dissolves after adding the $H_2O$/EG/CA mixture). Cerium-(III)-nitrate hexahydrate (0.1954 g $Ce(NO_3)_3*6H_2O$) was dissolved in 0.842 ml of the $H_2O$/EG/CA mixture and 9 μl concentrated nitric acid (69%) were added. Sodium nitrate (0.0085 g $NaNO_3$) was dissolved in 0.187 ml of the $H_2O$/EG/CA mixture and 2 μl of concentrated nitric acid (69%) were added. The three solutions obtained were mixed and vortexed for 60 minutes via an orbital shaker. Subsequently solvent of the solutions was evaporated and the evaporation residue obtained was calcined in air. To evaporate the solvent the solutions were heated from room temperature up to 70° C. with a heating rate of 7.5° C./hour. After a dwell time of 24 hours at 70° C. the mixture was heated up to 200° C. with a heating rate of 26° C./hours. After holding this temperature for 24 hours the sample was heated up to 400° C. with a heating rate of 200° C./hour. The samples were calcined at 400° C. for 5 hours. The calcined oxide powders were cooled to room temperature with a rate of 20° C./hour (fresh samples).

COMPARATIVE EXAMPLE 2

$Bi_{10}Ce_{80}Sr_{10}O_x$ (EP 2 438 984 A1, Example 2)

The metal nitrate salts (0.5988 g of $Ce(NO_3)_3*6H_2O$, 0.0836 g of $Bi(NO_3)_3*5H_2O$ and 0.0365 g of $Sr(NO_3)_2$) were mixed resulting in a molar ratio of Ce/Bi/Sr=0.8/0.1/0.1 and 5 ml deionized water were added. After the dissolution of the nitrate salts, a white precipitate had formed and 3 ml of concentrated nitric acid (69%) were added. The mixture obtained was stirred until a clear solution was obtained. To the solution obtained again water was added so that the total volume of the final solution was 50 ml. To the solution obtained 40 ml of the precipitating agent (1 molar ammonium carbonate aqueous solution) were added slowly while stirring. The suspension obtained was further stirred for 30 minutes. A precipitate was obtained, filtered, washed with deionized water and dried at 125° C. for 15 hours in air atmosphere. The dried solid was calcined at 400° C. for 5 hours.

COMPARATIVE EXAMPLE 3

$Bi_{10}Ce_{50}Pr_{40}O_x$ (EP 2 210 861 B1, Example 1)

First, 0.6809 g of praseodymium oxide ($Pr_6O_{11}$, 99.9%, ABCR) were dissolved in 4.5 ml concentrated nitric acid (69%). Then, 2.1711 g of cerium nitrate hexahydrate ($Ce(NO_3)_3*6H_2O$, 99.9%, ChemPur) and 0.485 bismuth nitrate pentahydrate ($Bi(NO_3)_3*5H_2O$, ≥99.99%, Sigma-Aldrich) were added to the nitric acid solution of Pr resulting in a molar ratio of Ce/Bi/Pr=0.5/0.1/0.4. To the solution obtained 45 ml of the precipitating agent (1 molar ammonium carbonate aqueous solution) were added slowly, while stirring for 30 minutes. The precipitate obtained was filtered and washed with deionized water, dried at 125° C. for 15 hours in air. The dried solid obtained was calcined at 400° C. for 5 hours.

COMPARATIVE EXAMPLE 4

$Ce_{50}K_{50}O_x$ (WO 2006/04482)

The comparative example 3 was prepared by melting the corresponding nitrate salts. For this comparative example 1.0856 g of $Ce(NO_3)_3*6H_2O$ and 0.2528 g of $KNO_3$ were manually mixed. The mixture obtained was heated from room temperature up to 350° C. with a heating rate of 50° C./hour. The temperature of 350° C. was kept constant for 12 hours and subsequently decreased again to room temperature with a rate of 120° C./hours. The solid obtained was calcined at 400° C. for 5 hours.

COMPARATIVE EXAMPLE 5

$Ce_{50}K_{50}O_x$ (WO 2006/044822 A1)

Was synthesized by dissolving 4.3422 g $Ce(NO_3)_3*6H_2O$ in 10 ml of deionized water and adding 0.6910 g of $K_2CO_3$ to the aqueous Ce solution. The solution obtained was reduced in volume by evaporation at 120° C. for 24 hours in air. The dried solid obtained was calcined at 400° C. for 5 hours.

COMPARATIVE EXAMPLE 6

$Ce_{66.7}K_{33.3}O_x$ (WO 2006/044822 A1)

Was prepared by melting the corresponding nitrate salts. For this comparative example 1.7369 g of $Ce(NO_3)_3*6H_2O$ and 0.2022 g of $KNO_3$ were manually mixed. The mixture obtained was heated from room temperature up to 350° C. with a heating rate of 50° C./hour. The temperature of 350° C. was kept constant for 12 hours and subsequently decreased again to room temperature with a rate of 120° C./hour. The solid obtained was calcined at 400° C. for 5 hours.

COMPARATIVE EXAMPLE 7

$Ce_{66.7}K_{33.3}O_x$ (WO 2006/044822 A1)

Was synthesized by dissolving 4.3422 g of $Ce(NO_3)_3*6H_2O$ in 10 ml of deionized water and adding 0.3455 g of $K_2CO_3$ to the aqueous Ce solution. The solution obtained was reduced in volume by evaporation at 120° C. for 24 hours in air. The dried solid obtained was calcined at 400° C. for 5 hours.

COMPARATIVE EXAMPLE 8

$Bi_{0.45}Ce_{0.45}Sr_{0.1}O_x$

Was synthesized via a polymer complex sol-gel method.

A mixture of 200 ml deionized water, 133.84 ml of ethylene glycol (EG) and 189.14 g citric acid monohydrate (CA) was used as solvent.

The stoichiometric amount of bismuth-(III)-oxide (5.17 g of $Bi_2O_3$) was dissolved in 11.81 g concentrated nitric acid (69%) and 39.77 g of the $H_2O$/EG/CA mixture were added (after the dissolution of $Bi_2O_3$ a white precipitate may form, which dissolves after adding the $H_2O$/EG/CA mixture). Cerium-(III)-nitrate hexahydrate (9.64 g $Ce(NO_3)_3*6H_2O$) and strontium carbonate (0.71 g $SrCO_3$) were dissolved in 59.52 g of the $H_2O$/EG/CA mixture and 0.85 g concentrated nitric acid (69%) were added. The two solutions obtained were mixed for 60 minutes via an magnetic stirrer. Subsequently solvent of the solutions was evaporated and the evaporation residue obtained was calcined in air. To evaporate the solvent the solutions were heated from room temperature up to 70° C. with a heating rate of 7.5° C./hour. After a dwell time of 24 hours at 70° C. the mixture was heated up to 200° C. with a heating rate of 26° C./hours. After holding this temperature for 24 hours the sample was heated up to 400° C. with a heating rate of 200° C./hour. The samples were calcined at 400° C. for 5 hours. The calcined oxide powders were cooled to room temperature with a rate of 20° C./hour (fresh samples).

COMPARATIVE EXAMPLE 9

$Bi_{0.45}Ce_{0.45}Pr_{0.1}O_x$

Was synthesized via a polymer complex sol-gel method.

A mixture of 200 ml deionized water, 133.84 ml of ethylene glycol (EG) and 189.14 g citric acid monohydrate (CA) was used as solvent.

The stoichiometric amount of bismuth-(III)-oxide (5.23 g of $Bi_2O_3$) was dissolved in 11.81 g concentrated nitric acid (69%) and 40.26 g of the $H_2O$/EG/CA mixture were added (after the dissolution of $Bi_2O_3$ a white precipitate may form, which dissolves after adding the $H_2O$/EG/CA mixture). Cerium-(III)-nitrate hexahydrate (9.38 g $Ce(NO_3)_3*6H_2O$) and praseodymium nitrate hexahydrate (2.09 g $Pr(NO_3)_3*6H_2O$) were dissolved in 59.52 g of the $H_2O$/EG/CA mixture and 0.85 g concentrated nitric acid (69%) were added. The two solutions obtained were mixed for 60 minutes via an magnetic stirrer. Subsequently solvent of the solutions was evaporated and the evaporation residue obtained was calcined in air. To evaporate the solvent the solutions were heated from room temperature up to 70° C. with a heating rate of 7.5° C./hour. After a dwell time of 24 hours at 70° C. the mixture was heated up to 200° C. with a heating rate of 26° C./hours. After holding this temperature for 24 hours the sample was heated up to 400° C. with a heating rate of 200° C./hour. The samples were calcined at 400° C. for 5 hours. The calcined oxide powders were cooled to room temperature with a rate of 20° C./hour (fresh samples).

COMPARATIVE EXAMPLE 10

$Bi_{0.45}Ce_{0.45}Fe_{0.1}O_x$

Was synthesized via a polymer complex sol-gel method.

A mixture of 200 ml deionized water, 133.84 ml of ethylene glycol (EG) and 189.14 g citric acid monohydrate (CA) was used as solvent.

The stoichiometric amount of bismuth-(III)-oxide (5.03 g of $Bi_2O_3$) was dissolved in 11.81 g concentrated nitric acid (69%) and 38.7 g of the $H_2O$/EG/CA mixture were added (after the dissolution of $Bi_2O_3$ a white precipitate may form, which dissolves after adding the $H_2O$/EG/CA mixture). Cerium-(III)-nitrate hexahydrate (9.38 g $Ce(NO_3)_3*6H_2O$) and iron (III) nitrate nonahydrate (1.94 g $Fe(NO_3)_3*9H_2O$) were dissolved in 59.52 g of the $H_2O$/EG/CA mixture and 0.85 g concentrated nitric acid (69%) were added. The two solutions obtained were mixed for 60 minutes via an magnetic stirrer. Subsequently solvent of the solutions was evaporated and the evaporation residue obtained was calcined in air. To evaporate the solvent the solutions were heated from room temperature up to 70° C. with a heating rate of 7.5° C./hour. After a dwell time of 24 hours at 70° C. the mixture was heated up to 200° C. with a heating rate of 26° C./hours. After holding this temperature for 24 hours the sample was heated up to 400° C. with a heating rate of 200° C./hour. The samples were calcined at 400° C. for 5 hours. The calcined oxide powders were cooled to room temperature with a rate of 20° C./hour (fresh samples).

Results of Catalytic Testing

Table 2 shows the PM removal efficiency, measured with method A, of the Cerium-Bismuth-Alkaline compositions of the present invention prepared according to examples 1 to 6, as well as for the comparative examples 1 and 2 in the fresh status (calcined at 400° C./2 hours) and after thermal aging of the powders at 800° C./2 hours.

TABLE 2

| Sample | Composition | $T_{50}$ fresh [° C.] | $T_{50}$ aged [° C.] |
|---|---|---|---|
| Example 1 | $Bi_{0.45}Ce_{0.45}K_{0.10}O_{1.65-1.4}$ | 515 | 535 |
| Example 2 | $Bi_{0.40}Ce_{0.40}K_{0.20}O_{1.4-1.2}$ | 510 | 519 |
| Example 3 | $Bi_{0.30}Ce_{0.60}K_{0.10}O_{1.7-1.4}$ | 520 | 536 |
| Example 4 | $Bi_{0.80}Ce_{0.10}K_{0.10}O_{1.5-1.4}$ | 498 | 563 |
| Example 5 | $Bi_{0.10}Ce_{0.80}K_{0.10}O_{1.8-1.4}$ | 535 | 547 |
| Comparative Example 1 | $Bi_{0.45}Ce_{0.45}Na_{0.10}O_{1.65-1.4}$ | 569 | 584 |
| Comparative Example 2 | $Bi_{10}Ce_{80}Sr_{10}O_x$ | 608 | 627 |
| Comparative Example 3 | $Bi_{10}Ce_{50}Pr_{40}O_x$ | 606 | 634 |

The catalytic test results showed that all the materials of the examples 1 to 5 have a lower $T_{50}$-value after thermal aging and in the fresh status than the materials of comparative examples 1, 2 and 3.

Results of Catalytic Testing After Hydrothermal Treatment:

Table 3 below shows the PM removal efficiency, measured with method A, of three compositions of the present invention and those of compositions of the comparative examples 3, 4, 5 and 6, both in the fresh status as well as after hydrothermal treatment. The compositions of comparative examples 3 to 6 show an excellent catalytic activity in the fresh status. In contrast to that, however, the compositions of the comparative examples lose their catalytic activity after hydrothermal aging in contrast to the examples of the present invention, which still show catalytic activity.

TABLE 3

| Sample | Composition | $T_{50}$ fresh [° C.] | $T_{50}$ hydrothermally aged [° C.] |
|---|---|---|---|
| Example 1 | $Bi_{0.45}Ce_{0.45}K_{0.10}O_{1.65-1.4}$ | 515 | 582 |
| Example 2 | $Bi_{0.40}Ce_{0.40}K_{0.20}O_{1.4-1.2}$ | 510 | 595 |
| Example 3 | $Bi_{0.30}Ce_{0.60}K_{0.10}O_{1.7-1.4}$ | 520 | 584 |
| Comparative Example 4 | $Ce_{50}K_{50}O_x$ | 468 | 655 |
| Comparative Example 5 | $Ce_{50}K_{50}O_x$ | 470 | 655 |
| Comparative Example 6 | $Ce_{70}K_{30}O_x$ | 464 | 672 |
| Comparative Example 7 | $Ce_{70}K_{30}O_x$ | 524 | 678 |

Effect of Potassium Doping of Different Ce—Bi-M-mixed Metal Oxides:

Table 4 below shows the effect of potassium doping of three different Ce-Bi-M-mixed metal oxides for PM removal efficiency, measured with method B. All compositions doped with potassium are more catalytic active for the soot oxidation than the undoped compositions both in the fresh status as well as after thermal treatment.

TABLE 4

| Sample | Composition | $T_{50}$ fresh [° C.] | $T_{50}$ aged [° C.] |
|---|---|---|---|
| Example 1 | $Bi_{0.45}Ce_{0.45}K_{0.10}O_{1.65-1.4}$ | 426 | 479 |
| Example 6 | $Bi_{0.4}Ce_{0.4}K_{0.1}Sr_{0.1}O_{1.55-1.35}$ | 414 | 490 |
| Example 7 | $Bi_{0.4}Ce_{0.4}K_{0.1}Pr_{0.1}O_{1.6-1.4}$ | 437 | 498 |
| Example 8 | $Bi_{0.4}Ce_{0.4}K_{0.1}Fe_{0.1}O_{1.6-1.4}$ | 414 | 507 |
| Comparative Example 8 | $Bi_{45}Ce_{45}Sr_{10}O_x$ | 518 | 525 |
| Comparative Example 9 | $Bi_{45}Ce_{45}Pr_{10}O_x$ | 458 | 508 |
| Comparative Example 10 | $Bi_{45}Ce_{45}Fe_{10}O_x$ | 490 | 515 |

The invention claimed is:

1. A composition of formula I:

$$Ce_{1-a-b-c}N_aM_bD_cO_x \qquad I$$

wherein
M stands for one or more elements from the group of alkaline metals, except sodium,
N is Bi and/or Sb,
D is present, or is not present, and if present is selected from one or more of
Mg, Ca, Sr, Ba;
Y, La, Pr, Nd, Sm, Gd, Er;
Fe, Zr, Nb, Al;
a is a number within the range of $0<a\leq0.9$,
b is a number within the range of $0<b\leq0.3$,
c is a number within the range of $0<c\leq0.2$;
a plus b plus c is <1, and
x is a number within the range of $1.2\leq x\leq2$.

2. A composition of claim 1 wherein D is present.
3. A composition of claim 1, wherein D is Ca, Sr, or Ba.
4. A composition of claim 3, wherein D is Sr.
5. A composition of claim 1, wherein D is Y, Pr, La, or Nd.
6. A composition of claim 5, wherein D is Pr.
7. A composition of claim 1, wherein D is Fe, Zr, Nb, or Al.
8. A composition of claim 7, wherein D is Fe.
9. A composition of claim 7, wherein D is Al.
10. A composition of claim 1, wherein c is a number within the range of $0\leq c\leq0.1$.
11. A composition of claim 1 which is of formula II $$Ce_{1-a-b}N_aM_bO_x \qquad II$$

wherein
M stands for one or more elements from the group of alkaline metals, except sodium
N is Bi and/or Sb,
a is a number within the range of $0<a\leq0.9$,
b is a number within the range of $0<b\leq0.3$,
a plus b is <1, and
x is a number within the range of $1.2\leq x\leq2$.

12. A composition of claim 11, wherein N is Bi.
13. A composition of claim 1, wherein M is potassium.
14. A composition of claim 11, wherein a is a number within the range of $0.01\leq a\leq0.9$.
15. A composition of claim 11, wherein b is a number within the range of $0.01\leq b\leq0.3$.
16. A composition of claim 15, wherein b is a number within the range of $0.1\leq b\leq0.2$.
17. An exhaust gas after treatment system of a diesel engine, gasoline combustion engine, lean burn engine, or power plant comprising a catalyst that includes the composition of claim 11.
18. A composition of claim 11, wherein M is potassium.
19. A composition of claim 1, which is selected from the group consisting of
$Bi_{0.45}Ce_{0.45}K_{0.10}O_{1.65-1.4}$,
$Bi_{0.40}Ce_{0.40}K_{0.20}O_{1.4-1.2}$,
$Bi_{0.30}Ce_{0.60}K_{0.10}O_{1.7-1.4}$,
$Bi_{0.80}Ce_{0.10}K_{0.10}O_{1.5-1.4}$,
$Bi_{0.10}Ce_{0.80}K_{0.10}O_{1.8-1.4}$,
$Bi_{0.4}Ce_{0.4}K_{0.1}Sr_{0.1}O_{1.55-1.35}$,
$Bi_{0.4}Ce_{0.4}K_{0.1}Pr_{0.1}O_{1.6-1.4}$, and
$Bi_{0.4}Ce_{0.4}K_{0.1}Fe_{0.1}O_{1.6-1.4}$.
20. An exhaust gas after treatment system of a diesel engine, gasoline combustion engine, lean burn engine, or power plant comprising a catalyst that includes the composition of claim 1.

* * * * *